(12) United States Patent
Calisti et al.

(10) Patent No.: US 8,398,759 B2
(45) Date of Patent: Mar. 19, 2013

(54) ENVIRONMENTAL FRIENDLY ANTI-MICROBIAL ADHESION AGENTS FOR ANTI-FOULING PAINTS AND ANTI-FOULING PAINTS CONTAINING THEM

(75) Inventors: Cecilia Calisti, Viterbo (IT); Giulio Zanaroli, Bologna (IT); Fabio Fava, Bologna (IT); Alessandra Bontempi Di Roccaspada, Trieste (IT); Maurizio Ruzzi, Viterbo (IT)

(73) Assignee: Biopaint S.R.L., Colleretto Giacosa (Torino) (IT)

( * ) Notice: Subject to any disclaimer, the term of this patent is extended or adjusted under 35 U.S.C. 154(b) by 0 days.

(21) Appl. No.: 12/992,264

(22) PCT Filed: May 12, 2009

(86) PCT No.: PCT/IB2009/051945
§ 371 (c)(1),
(2), (4) Date: Nov. 11, 2010

(87) PCT Pub. No.: WO2009/138950
PCT Pub. Date: Nov. 19, 2009

(65) Prior Publication Data
US 2011/0061563 A1    Mar. 17, 2011

(30) Foreign Application Priority Data

May 12, 2008  (IT) ............................... TO2008A0348

(51) Int. Cl.
*C09D 5/14* (2006.01)
*C09D 5/16* (2006.01)
*A01N 43/00* (2006.01)
*A01N 65/00* (2009.01)

(52) U.S. Cl. ............... 106/18.32; 106/15.05; 106/18.33; 106/18.35; 424/78.09; 424/725; 424/776; 424/777; 514/185; 514/188; 514/372; 514/373; 514/477; 514/500; 514/579; 514/607; 514/693; 514/699; 514/700; 523/122

(58) Field of Classification Search ............... 106/15.05, 106/18.33, 18.32, 18.35; 514/693, 699, 700, 514/185, 188, 372, 373, 477, 500, 579, 607; 424/78.09, 725, 776, 777; 523/122
See application file for complete search history.

(56) References Cited

U.S. PATENT DOCUMENTS

| | | | |
|---|---|---|---|
| 5,441,743 A | 8/1995 | McGinniss et al. | 424/407 |
| 5,914,357 A | 6/1999 | Nakamura et al. | 523/177 |
| 6,780,900 B1 | 8/2004 | Malhotra | 523/160 |
| 2002/0151629 A1 * | 10/2002 | Buffkin et al. | 524/284 |
| 2003/0162866 A1 * | 8/2003 | Prat et al. | 524/2 |
| 2008/0071005 A1 | 3/2008 | Shin | 523/122 |

FOREIGN PATENT DOCUMENTS

| | | | |
|---|---|---|---|
| CA | 899782 A | * | 5/1972 |
| DE | 102006062435 | | 10/2007 |
| FR | 2804424 | | 11/2002 |
| JP | 07305002 | | 11/1995 |
| JP | 2004-196677 A | * | 7/2011 |
| SU | 662545 A | * | 12/1977 |
| WO | WO 90/06975 | | 6/1990 |
| WO | WO 92/20747 | | 11/1992 |
| WO | WO 97/48786 | | 12/1997 |
| WO | WO 2007/007080 A1 | * | 1/2007 |

OTHER PUBLICATIONS

Machine Translation of Japanese Patent Specification No. 07-305002 (Nov. 1995).*
Derwent-Acc-No. 2009-E72418, abstract of KR 2008101373A (Nov. 2008).*
International Search Report for PCT/IB2009/051945 filed on May 12, 2009 in the name of Biopaint S.R.L.
Written Opinion for PCT/IB2009/051945 filed on May 12, 2009 in the name of Biopaint S.R.L.

* cited by examiner

*Primary Examiner* — Anthony J Green
(74) *Attorney, Agent, or Firm* — Steinfl & Bruno, LLP

(57) ABSTRACT

An ecologically compatible anti-microbial-adhesion agent is described, which is particularly suitable for use in anti-fouling paints, preferably for boats, characterized in that it comprises a compound selected from eugenol, vanillin, benzaldehyde substituted with one or two substituents selected from the groups —OH (hydroxy) and —OCH3 (methoxy), or any combination thereof. An anti-fouling paint is also described, particularly for boats, comprising the anti-microbial-adhesion agent mentioned above and other components selected from conventional biocides, solvents, resins, pigments, charges and fillings, and combinations thereof.

17 Claims, 7 Drawing Sheets

ENVIRONMENTAL FRIENDLY ANTI-MICROBIAL ADHESION AGENTS FOR ANTI-FOULING PAINTS AND ANTI-FOULING PAINTS CONTAINING THEM

CROSS REFERENCE TO RELATED APPLICATIONS

The present application is the US national stage of International Application PCT/IB2009/051945 filed on May 12, 2009 which, in turn, claims priority to Italian Application TO2008A000348 filed on May 12, 2008.

The present invention relates to a novel ecologically compatible anti-microbial-adhesion-agent mainly based on natural substances, as well as anti-fouling paints containing such an anti-microbial-adhesion agent.

The known anti-fouling paints contain anti-fouling agents, i.e. substances capable of preventing or hindering the bio-fouling phenomenon, that is to say the accumulation of micro-organisms, plants, animals or algae on the surfaces of submerged structures, in particular boat hulls. The term anti-fouling is intended to mean the ability of a substance to remove or prevent the accumulation of the above-mentioned organisms and microorganisms, irrespective of the mode and mechanism through which such an end is attained.

The substances used as anti-fouling agents in the existing anti-fouling paints for boats actually present a broad-range biocide activity. Among them, organic tin compounds (such as tributyltin, TBT), cuprous compounds and mercury-containing compounds are mentioned in particular. However, these substances exhibit the enormous drawback of being toxic and thus harmful to the environment.

Figure 1:
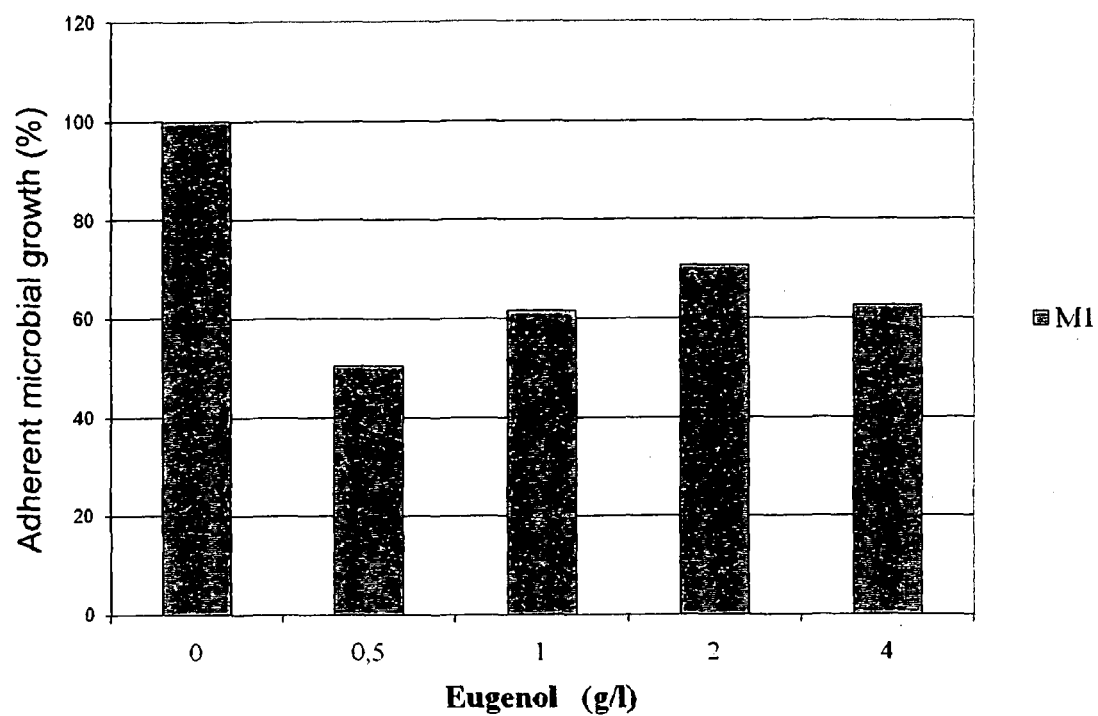
FIG. 1 shows a graph of adherent microbial growth (%) of M1 population incubated in the presence of eugenol at concentrations of between 0 and 4 g/L.

The present invention has the goal of overcoming the drawbacks mentioned above, in particular those related to the toxicity of the anti-fouling agents commonly used in the anti-fouling paints for boats.

Such an object is obtained thanks to the present invention that provides an ecologically compatible anti-fouling paint, characterized by comprising an anti-microbial-adhesion agent selected from the group consisting of eugenol, vanillin, benzaldehyde substituted with one or two substituents selected from the groups —OH (hydroxy) and —OCH$_3$ (meth-oxy), and mixtures thereof.

Preferred benzaldehyde derivatives are 4-hydroxybenzaldehyde, 3,4-dihydroxybenzaldehyde, 2,5-dimethoxybenzaldehyde, 3,4-dimethoxybenzaldehyde.

The anti-microbial-adhesion agent as defined above is also within the scope of the invention.

One advantage of the anti-adhesion agent of the invention is that it contains non-toxic substances with little or no biocide activity, but however it exhibits a suitable anti-microbial-adhesion activity. Such substances, at least in the case of vanillin and eugenol, are naturally-derived and thus perfectly compatible with the environment, that is biodegradable in sea habitats and sediments. However, benzaldehyde derivatives are also non-polluting and compatible with the environment.

Due to such eco-compatibility features, the anti-microbial-adhesion agent of the invention is advantageously suitable to be used in paints and in general in anti-fouling coatings intended to be applied to boat hulls or any surface designated to be in continuous contact with the water environment, i.e. sea water.

In addition to the anti-microbial-adhesion agent, generally an anti-fouling paint comprises solvents, resins, pigments, charges and fillings and other optional additives.

The anti-fouling paint of the invention comprises the anti-microbial-adhesion agent in an amount preferably from 3 to 30 wt %, even more preferably from 5 to 20 wt %. Concentrations exceeding 30% could change the chemo-physical properties and the stability of the paint.

Resins that may be used in the anti-fouling paint of the invention are, for example, vinyl resins, acrylic resins, epoxy resins, naturally occurring resins such as colophonia and colophonia esters. The resin content in the paint is preferably from 5 to 40 wt %, even more preferably from 10 to 30 wt %. Concentrations below 5% might not guarantee adhesion and proper formation of the paint film.

Solvents that may be used in the anti-fouling paint of the invention are, for example, hydrocarbon solvents such as xylol and naphtha, acetates such as methoxypropyl acetate, alcohols such as ethyl alcohol and isobutylic alcohol. The solvent content in the paint is preferably from 10 to 45 wt %. A solvent content below 10 % could determine exceedingly high viscosities.

Pigments that may be used in the anti-fouling paint of the invention are, for example, metal oxides such as titanium dioxide, iron oxides and organic pigments. The pigment content in the paint is preferably from 10 to 30 wt %.

Charges and fillings that may be used in the anti-fouling paint of the invention are, for example, zinc oxide, calcium carbonate and talc. The content of the filling charges in the paint is preferably from 3 to 30 wt %, used alone or in admixture.

Other optional additives that may be used in the anti-fouling paint of the invention are dispersant wetting agents, such as soy lecithin, tissue-tropism-inducing agents such as bentonite, stabilizing agents such as epoxy soybean oil. The content of these additives is preferably in the range from 0.1 to 3 wt %, used alone or in admixture.

The experiments carried out by the inventors, illustrated in detail in the experimental section that follows, have also unpredictably indicated that a synergistic effect can be obtained by use, in an anti-fouling paint of the type illustrated previously, of a combination of several anti-adhesion agents of the invention or a combination of an anti-adhesion agent of the invention and a conventional biocide agent.

By way of a non-limiting example, conventional biocides suitable to be used in combination with an anti-microbial-adhesion agent of the invention are the following:

zinc pyrithione (bis(1-hydroxy-2(1H)-pyridinethionate-O, S)-(T-4)zinc) (CAS 13463-41-7), commercially available from Arch under the name of Zinc Omadine;

copper pyrithione (bis(1-hydroxy-1H-pyridine-2-thionate-O,S) copper) (CAS 14915-37-8), commercially available from Arch under the name of Copper Omadine;

zinc ethylene bis dithiocarbamate ([[2-[(dithiocarboxy)amino]ethyl]carbamodithioate]](2-)-kS,kS'] zinc) (CAS 12122-67-7), commercially available under the name of Zineb;

tolylfluanide (N-dichlorofluoromethylthio-N,N'-dimethyl-N-p-tolyl-sulphamide) (CAS 731-27-1), available, for instance, from Bayer under the name of Preventol A5;

dichlofluanide (N-dichlorofluoromethylthio-N,N'-dimethyl-N-phenylsulphamide) (CAS 1085-98-9), available, for instance, from Bayer under the name of Preventol A4S;

4,5-Dichloro-2-N-octyl-4-isothiazoline-3-one (CAS 64359-81-5), 30% solution of the active substance available, for instance, from Rohm and Haas under the name of Sea-Nine 211;

N'-tert-butyl-N-cyclopropyl-6-(methylthio)-1,3,5-triazine-2,4-diamine (CAS 028159-98-0), available, for instance, from Ciba under the name of IRGAROL 1051.

The experimental section that follows, provided merely by way of illustration and not limitation, demonstrates the inhibition properties of the bio-film formation of the anti-microbial-adhesion agents of the invention and of the anti-fouling paints containing such anti-microbial-adhesion agents.

Experimental Section

The effect of the anti-microbial-adhesion agent of the invention on microbial adhesion and growth has been estimated by using mixed populations of biofilmogenic sea bacteria isolated from the Tyrrhenian Sea (M1), the Adriatic Sea (T1-T5) and an exhausted aquarium filter (F1).

Tests were performed with eugenol, vanillin and benzaldehyde derivates in the free form (example 1) and with eugenol and vanillin formulated into anti-fouling paints devoid of customary anti-fouling agents (example 2).

EXAMPLE 1

Tests with the Compounds in the Free Form

The tests with the compounds in the free form were carried out by using:

eugenol in a concentration in the range from 0.5 to 4 g/l, solubilized in an organic solvent (methanol);
vanillin in a concentration in the range from 0.1 to 5 g/l;
benzaldehyde derivatives in a concentration of 2 g/l.

The formation of the bio-film was assessed, in an indirect way, by measuring the amount of crystal violet retained by the cells grown adherently.

The tests were performed in 24-well microplates inoculated with sea bacteria from bio-films of cultures grown under static conditions for 2 weeks. The effect of the compounds was determined by culturing the microorganisms (starting $OD_{600}=0.5$) in synthetic sea water (Tropic Marin Sea Salt; 33 g/l) supplemented with yeast extract (3 g/l) and fungal peptone (5 g/l). After the inoculation, the plates were incubated at 20° C. for 5 days before assessing the formation of a bio-film ($OD_{570}$) and the growth of plankton ($OD_{600}$). The bio-film was estimated after staining with crystal violet.

Eugenol

Figure 2:
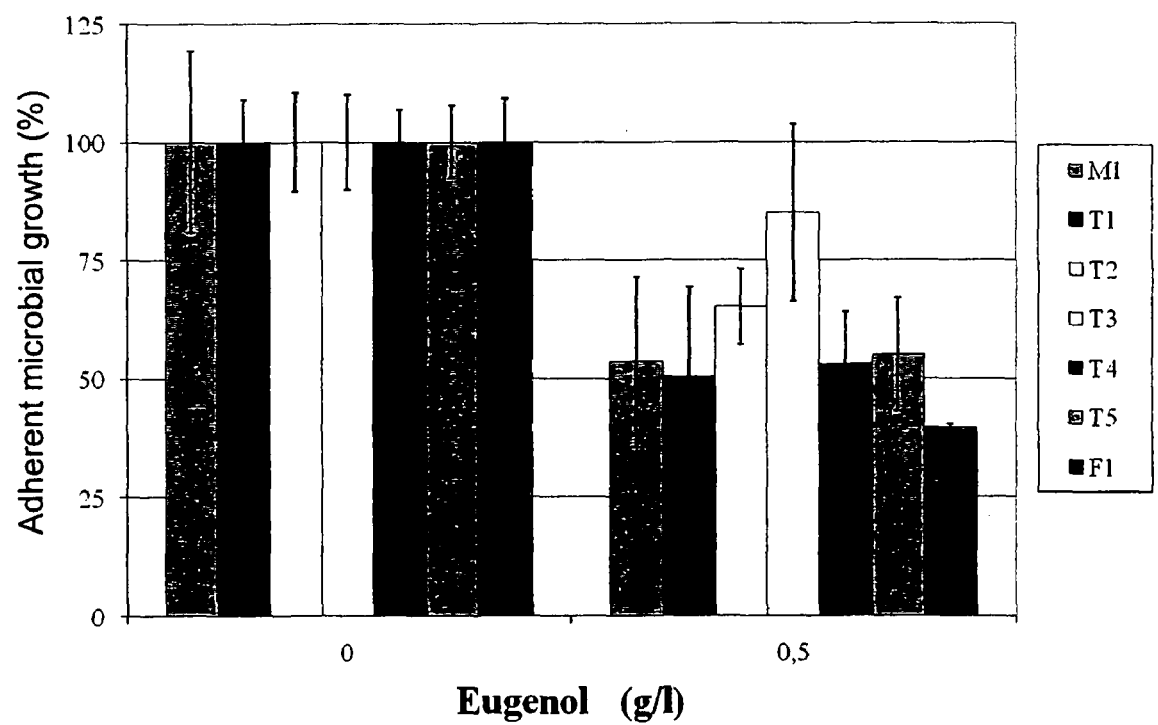
FIG. 2 shows a graph of adherent microbial growth (%) of M1, T1-T5, F1 populations incubated in the presence of eugenol at concentrations of 0 and 0.5 g/L.

The inhibition of adhesion experiments were carried out in 24-well microplates by using eugenol concentrations comprised between 0.5 and 4 g/l. The eugenol stock solution was obtained by melting 2 ml of the compound into 3 ml of methanol and 5 ml of a 10 M NaOH solution. The control plates were set up by adding the same volume of hydroalcoholic solution without eugenol. The results shown in FIG. 1 were obtained by using the M1 population. The tests were subsequently repeated with all 7 populations, using an eugenol concentration of 0.5 g/l. The results (FIG. 2) show that eugenol brings about a reduction of about 50% in the bio-film formation with all populations, except for T3, on which eugenol has a mild effect (inhibition of about 15%), and for F1, whose inhibition is of about 60%.

Vanillin

Figure 3A:
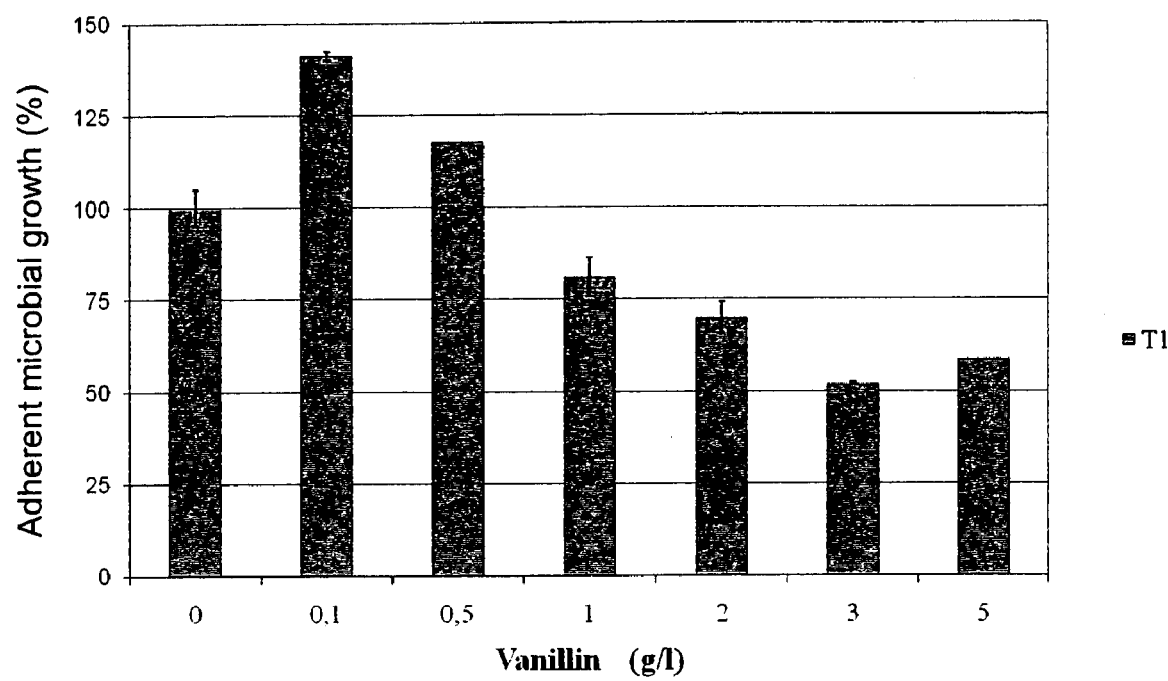
FIG. 3a shows a graph of adherent microbial growth (%) of T1 population incubated in the presence of vanillin at concentrations of between 0 and 5 g/L.
Figure 3B:
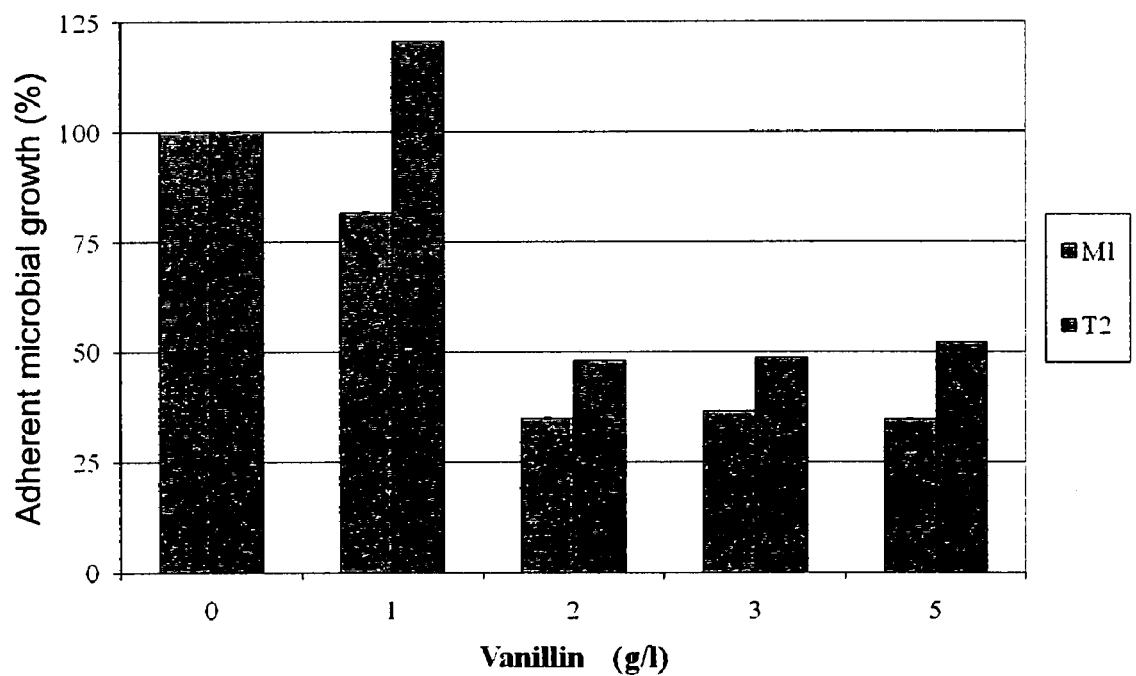
FIG. 3b shows a graph of adherent microbial growth (%) M1 and T1 population incubated in the presence of vanillin at concentrations of between 0 and 5 g/L.
Figure 4:
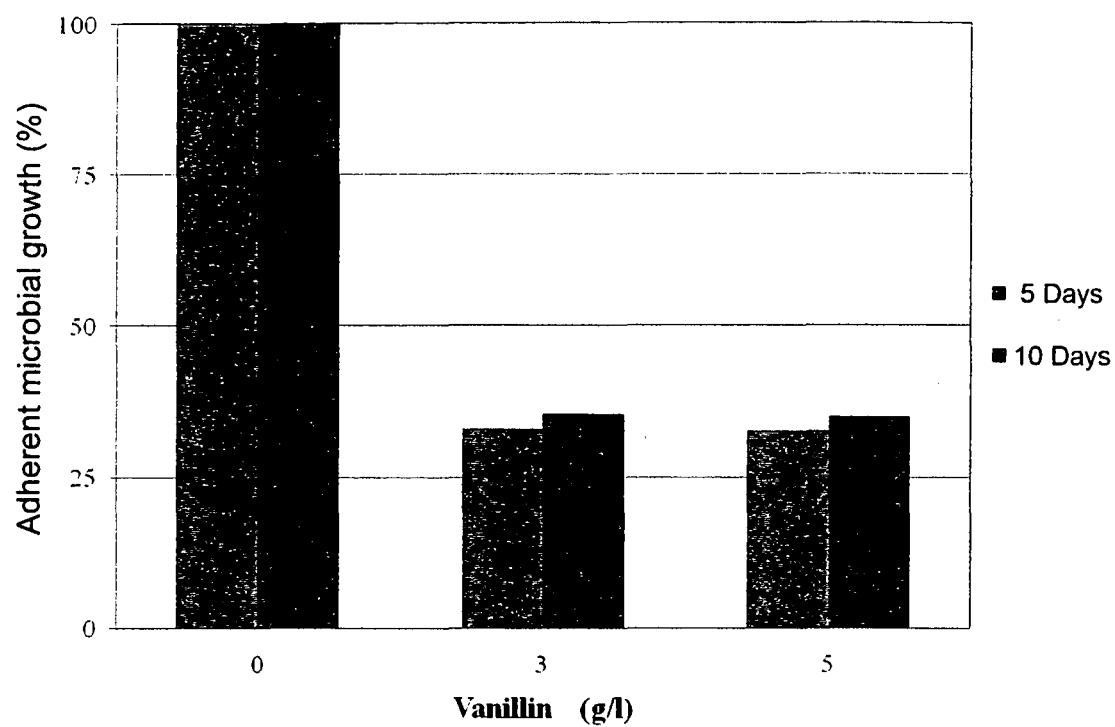
FIG. 4 shows a graph of adherent microbial growth (%) of M1 population after 5 and 10 days of being incubated in the presence of vanillin at concentrations of between 0 and 5 g/L.
Figure 5:
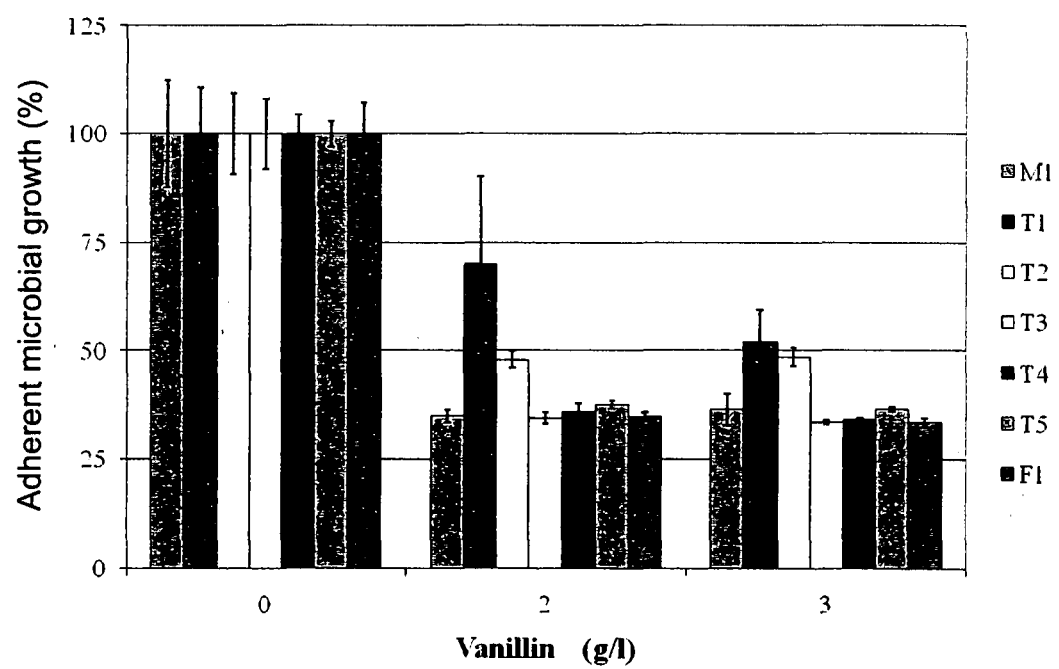
FIG. 5 shows a graph of adherent microbial growth (%) of M1, T1-T5, and F1 populations incubated in the presence of vanillin at concentrations of between 0 and 3 g/L.

In order to estimate the effectiveness of vanillin as an inhibitor of the formation of a bio-film, several tests were set up in microplates with increasing concentrations of vanillin, comprised between 0.1 and 5 g/l. The tests, which were performed by using biofilmogenic cells from the T1 (FIG. 3a), M1 and T2 (FIG. 3b), M1 (FIG. 4), M1, T1-T5 and F1 (FIG. 5) populations, show that vanillin, in concentrations above 1 g/l, inhibits the adhesion of microorganisms to solid surfaces. This inhibition effect persists even after 10 days of incubation (FIG. 4). The inhibition tests were repeated on all the 7 available populations, using vanillin concentrations of 2 and 3 g/l. The obtained results (FIG. 5) show that vanillin, at the concentrations used, causes a reduction in microbial adhesion comprised between 50 and 70%.

Benzaldehyde Derivatives

Figure 6:
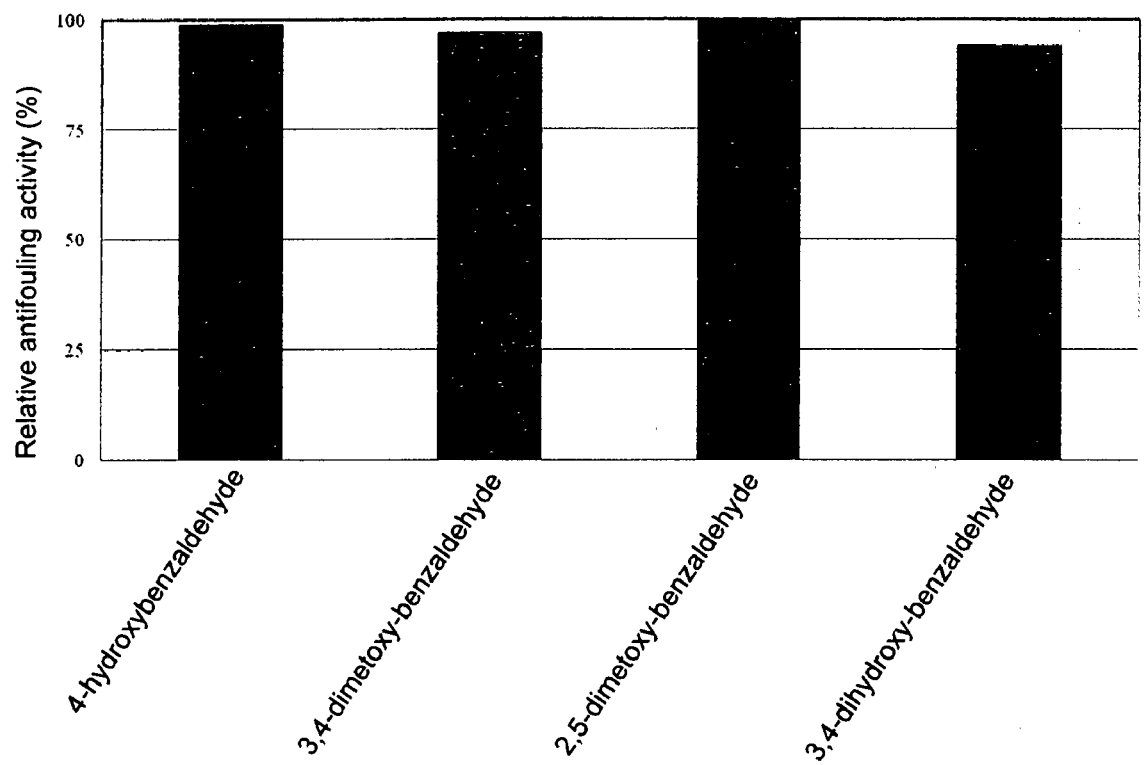
FIG. 6 shows a graph of the relative antifouling activity of 4-hydroxybenzaldehyde, 3,4-dimethoxybenzaldehyde, 2,5-dimethoxybezaldehyde, and 3,4-dihydroxymenzaldehyde.

Several tests were performed with the differently substituted benzoic compounds indicated in FIG. 6. Such tests evidenced that the tested compounds inhibit microbial adhesion with an effectiveness comparable to that of vanillin.

EXAMPLE 2

Tests with Anti-Fouling Paints

The effectiveness of paints supplemented with the anti-microbial-adhesion agents of the invention in inhibiting the adherent growth of the sea bacteria used in the previous tests was assessed. The formation of a bio-film ($OD_{570}$) was estimated by the microplate (24 wells) spectrophotometric assay described above.

Vanillin and eugenol were added to a paint devoid of any anti-fouling compound at 3 different concentrations: 5 g, 100 g, and 200 g per kg of paint.

Parallel assays were carried out by using microplates painted with a commercial anti-fouling product (Veneziani Raffaello bianca racing) and non-painted microplates. The Veneziani Raffaello control paint is a hydrophilic anti-fouling paint characterized by a high content of copper sulfocyanide CuSCN and by the presence of dichlofluanide and "pure carbon" particles.

The paints to be tested were applied only onto the side surface (corresponding to approximately 8.8 $cm^2$), avoiding to paint the bottom of the wells. The plates, after being painted, were maintained for 2 days at 20° C., in a dry and ventilated environment, before being used for the adhesion assay. The plates were inoculated with a cell suspension at an optical density (measured at 600 nm) of 0.5 absorbance units, kept under static incubation, in the dark, for 5 days at 20° C. 5 Days later, the microplates were drained and the growth of the plankton population was determined by a spectrophotometric assessment of the increase in absorbance of the incubation medium. The detection and quantification of a microbial biofilm formation was performed by a spectrophotometric assay. The biocide release rate under static conditions was calculated by measuring, through high performance liquid chromatography (HPLC), the increases in time of the biocide concentration in the liquid medium. For each biocide, 5 microplates were set up:

1 non-treated microplate;
1 microplate treated with a commercial anti-fouling paint;
1 microplate treated with a paint supplemented with 50 g of anti-microbial-adhesion agent per kg of paint;
1 microplate treated with a paint supplemented with 100 g of anti-microbial-adhesion agent per kg of paint;
1 microplate treated with a paint supplemented with 200 g of anti-microbial-adhesion agent per kg of paint.

Paints Supplemented with Eugenol

The protection treatment of the surfaces against microbial fouling was done by using three formulae containing 50 g (E50), 100 g (E100) and 200 g (E200), respectively, of eugenol per kg of paint. Preliminary tests to assess the effectiveness of eugenol as an anti-microbial-adhesion agent were performed with the paint supplemented with 100 g of eugenol/kg of paint using the 7 biofilmogenic sea microorganism mixed populations M1, T1-T5 and F1.

Figure 7:
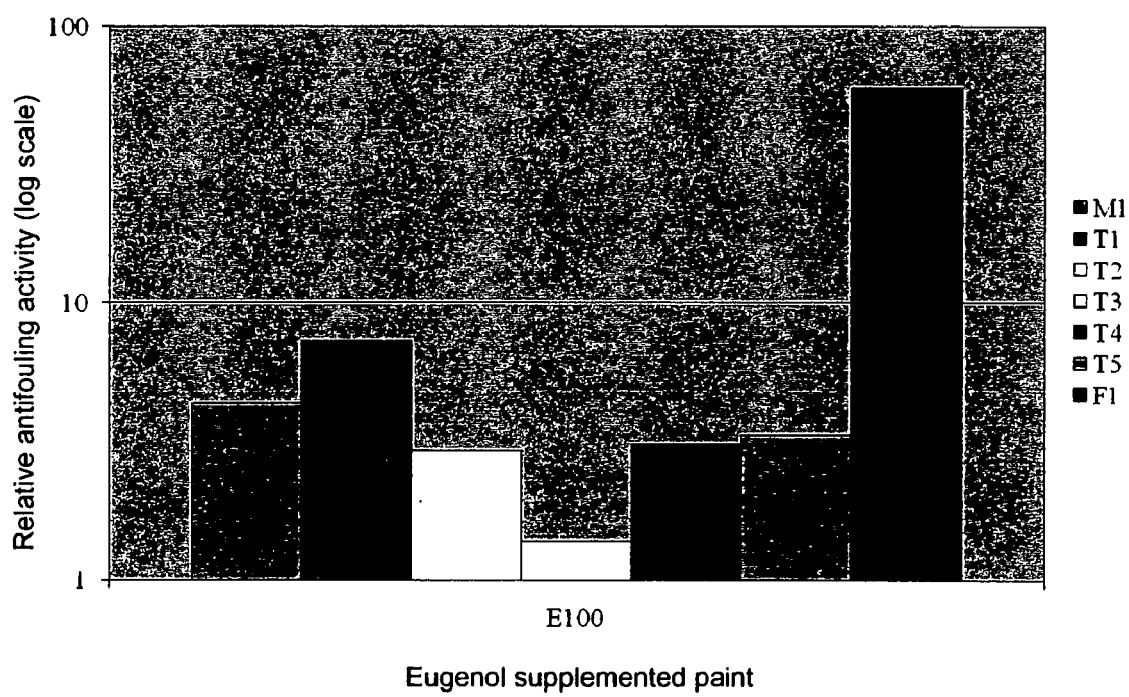
FIG. 7 shows a graph of the relative antifouling activity (log scale) of paint supplemented with 100 g of eugenol per kg of paint on M1, T1-T5, and F1 populations.
Figure 8:
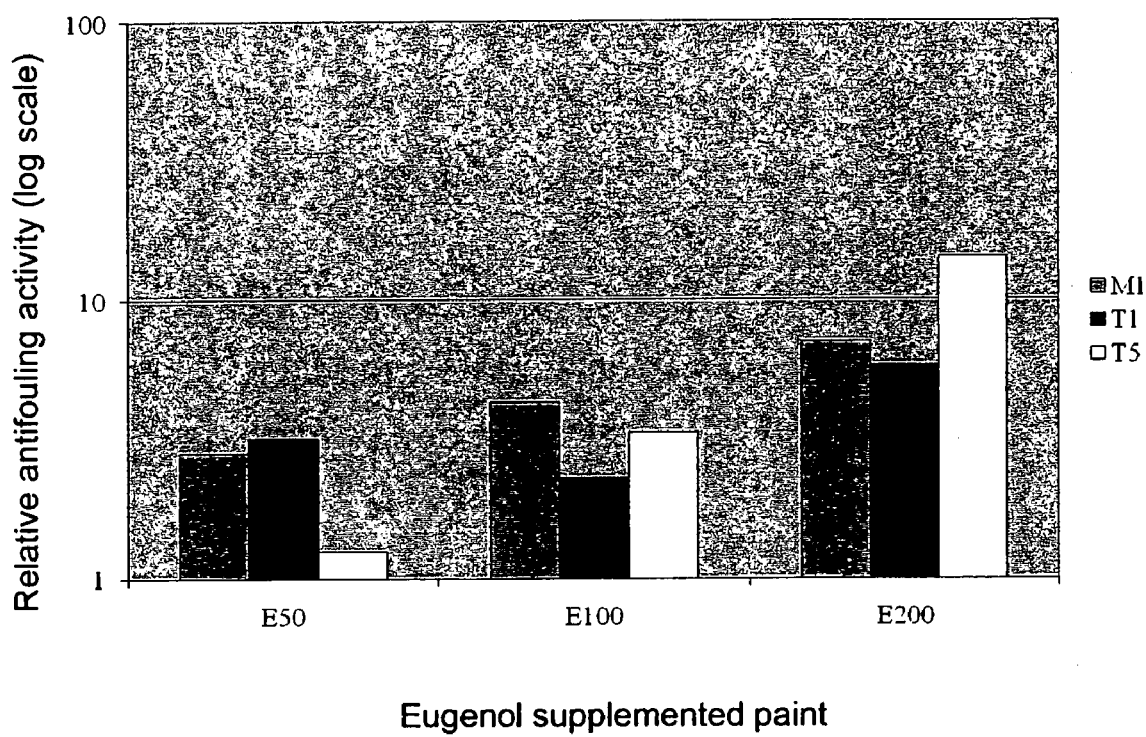
FIG. 8 shows a graph of the relative antifouling activity (log scale) of paint supplemented with 50 g (E50), 100 g (E100), and 200 g (E200) of eugenol per kg of paint on M1, T1 and T5 populations.

The obtained results show that paints supplemented with eugenol hinder more effectively the microbial bio-film formation compared to the commercial product. This result is independent of the type of microbial population used for the biological assay (FIG. 7) and can also be seen at the lowest concentration considered. In FIGS. 7 and 8, the relative activities refer to the control paint (Veneziani Raffaello). Higher relative activities correspond to paints that are more efficient.

The obtained results show that eugenol can be used as an anti-microbial-adhesion agent in sea paints in that it prevents, in a substantial way, adhesion of bacterial cells to treated surfaces (FIG. 7). By using 50 g of eugenol per kg of paint, a 1.2-3.2-fold reduced adherent growth of sea bacteria is achieved compared to the commercial product (FIG. 8).

Paints Supplemented with Vanillin

The protection treatment of the surfaces against microbial fouling was done by using three formulae containing 50 g (V50), 100 g (V100) and 200 g (V200), respectively, of vanillin per kg of paint.

The obtained results (FIG. 9) show that paints supplemented with vanillin hinder more effectively the microbial bio-film formation compared to the commercial product. The anti-microbial-adhesion activity is detectable in the 3 microbial populations considered. In this figure, the relative activities refer to the control paint (Veneziani Raffaello). Higher relative activities correspond to paints that are more efficient.

Figure 9:
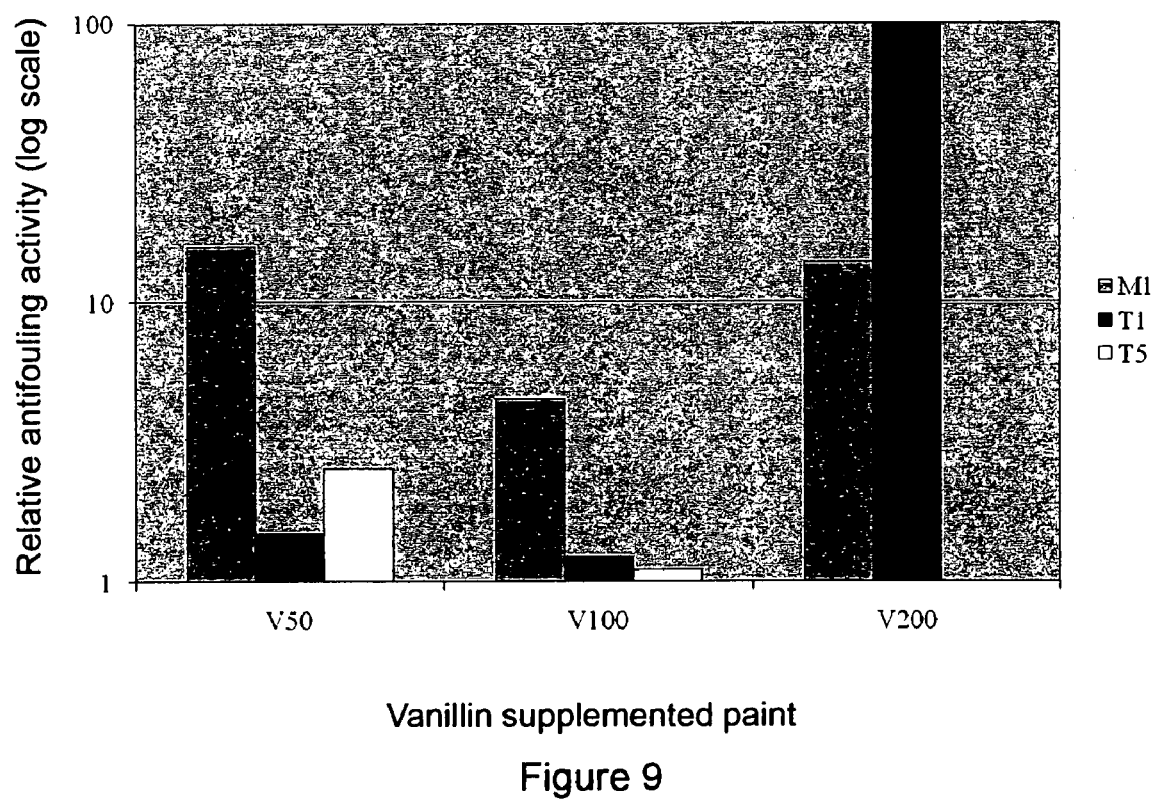
FIG. 9 shows a graph of the relative antifouling activity (log scale) of paint supplemented with 50 g (V50), 100 g (V100), and 200 g (V200) of vanillin per kg of paint on M1, T1 and T5 populations.

The obtained results show that vanillin can be used as an anti-microbial-adhesion agent in sea paints in that it prevents, in a substantial way, adhesion of bacterial cells to treated surfaces. By using 50 g of vanillin per kg of paint, a 1.5-15.8-fold reduced adherent growth of sea bacteria is achieved compared to the commercial product (FIG. 9).

Figure 10:
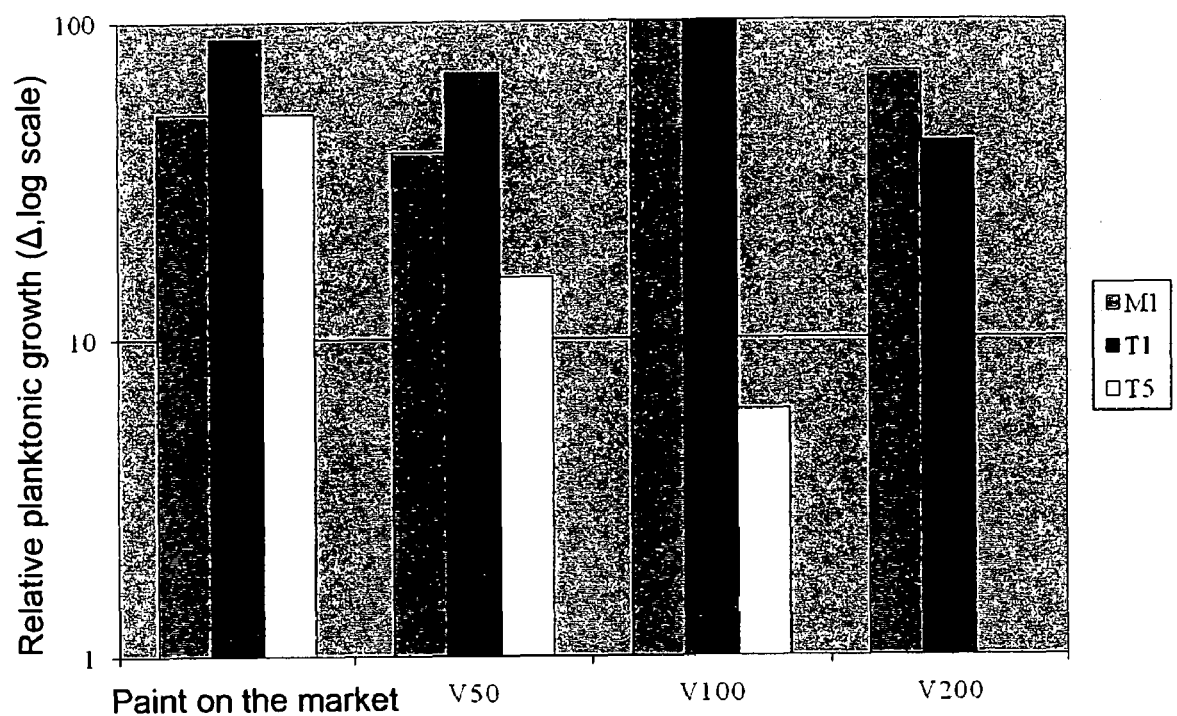
FIG. 10 shows a graph of the relative antifouling activity (log scale) of paint on the market and paint supplemented with 50 g (V50), 100 g (V100), and 200 g (V200) of vanillin per kg of paint on M1, T1 and T5 populations.

The release of vanillin has a reduced effect on the plankton growth of the three populations used in the biological assays (FIG. 10). This result indicates that the effect of vanillin on the adherent growth of microorganisms is not caused by inhibition of plankton growth. In FIG. 10, the increases in absorbance ($OD_{600}$) are expressed as relative values compared to non-treated samples (not painted).

Figure 11:
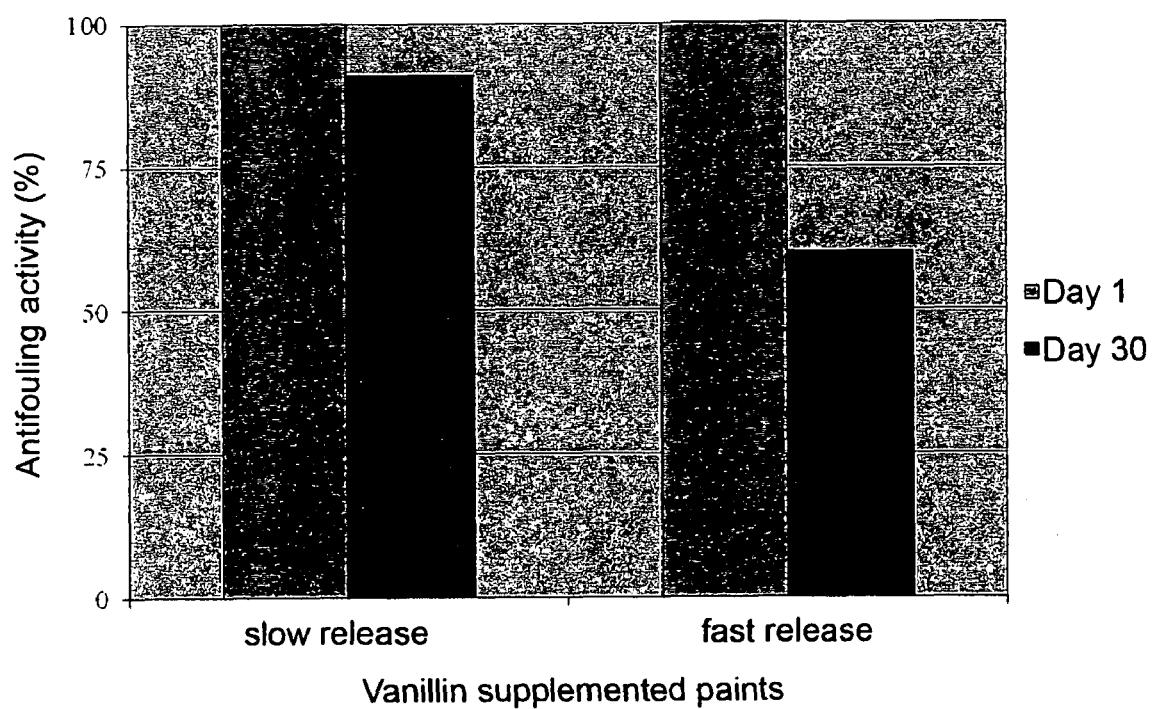
FIG. 11 shows a graph of the antifouling activity at 1 and 30 days of paint supplemented with vanillin that releases the vanillin at different rates.

Further tests carried out with vanillin-supplemented paints that release the anti-microbial-adhesion agent at different rates evidenced that a slow release of vanillin into the aqueous phase enables to attain an anti-fouling paint that is more stable in time (FIG. 11). In the figure, the anti-microbial-adhesion activity refers to the highest activity determined for each formula, expressed as 100%.

Paints Supplemented with Mixtures of Anti-Microbial-Adhesion Agents

Figure 12:
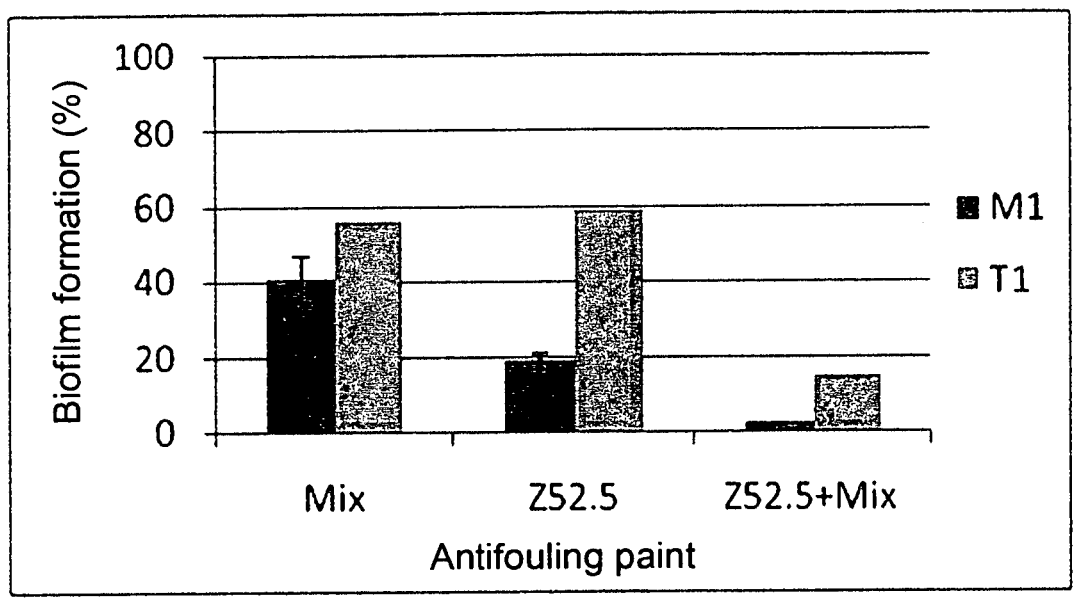
FIG. 12 shows a graph of biofilm formation (%) by sea bacteria M1 and T1 on surfaces treated with paints containing 3,4-dimethoxybenzaldehyde and vanillin (Mix), zinc prithione (Z52.5), and 3,4-dimethoxybenzaldehyde, zinc prithione, and vanillin (Z52.5+Mix).

By adding 52.5 g of 3,4-dimethoxybenzaldehyde to 1 kg of paint containing 52.5 g of vanillin, a 50-60% reduced adherent growth of sea bacteria is achieved compared to the product containing vanillin alone (Mix; FIG. 12).

Adding vanillin (52.5 g) and 3,4-dimethoxybenzaldehyde (52.5 g) to 1 kg of artificial paint containing 52.5 g of zinc pirithione (Z52.5+Mix) enables to obtain an anti-fouling paint that prevents more effectively, by 4-8-fold, the adhesion of bacterial cells to treated surfaces, compared to the product containing zinc pirithione alone (Z52.5; FIG. 12). In this figure, the bio-film formation is expressed as a percentage of the amount of bio-film detected on the surface treated with the paint containing 52.5 g of vanillin per kg of product (100%). A reduced formation of bio-film (lower percentages) is indicative of a greater effectiveness of the paint.

Paints Supplemented with Combinations of the Anti-Microbial-Adhesion Agents of the Invention and Conventional Biocides An anti-fouling paint was prepared by mixing the components indicated in example 2, including vanillin, with zinc pirithione (CAS N°. 13463-41-7). Zinc pirithione (Z) and vanillin (V) were used in the paint at a weight ratio of 1:1, in two different concentrations: 40 g (Z40+V40) and 52.5 g (Z52.5+V52.5) per kg of paint. An anti-fouling paint devoid of vanillin and containing zinc pirithione alone (Z52.5; 52.5 g of biocide per kg of paint) was used as a control.

The obtained results (FIG. 13) show that the paints supplemented with vanillin, at both of the concentrations examined (40 and 52.5 vanillin per kg of product), hinder the formation of a bio-film more effectively than that containing zinc pyrithione alone (Z52.5).

Figure 13:
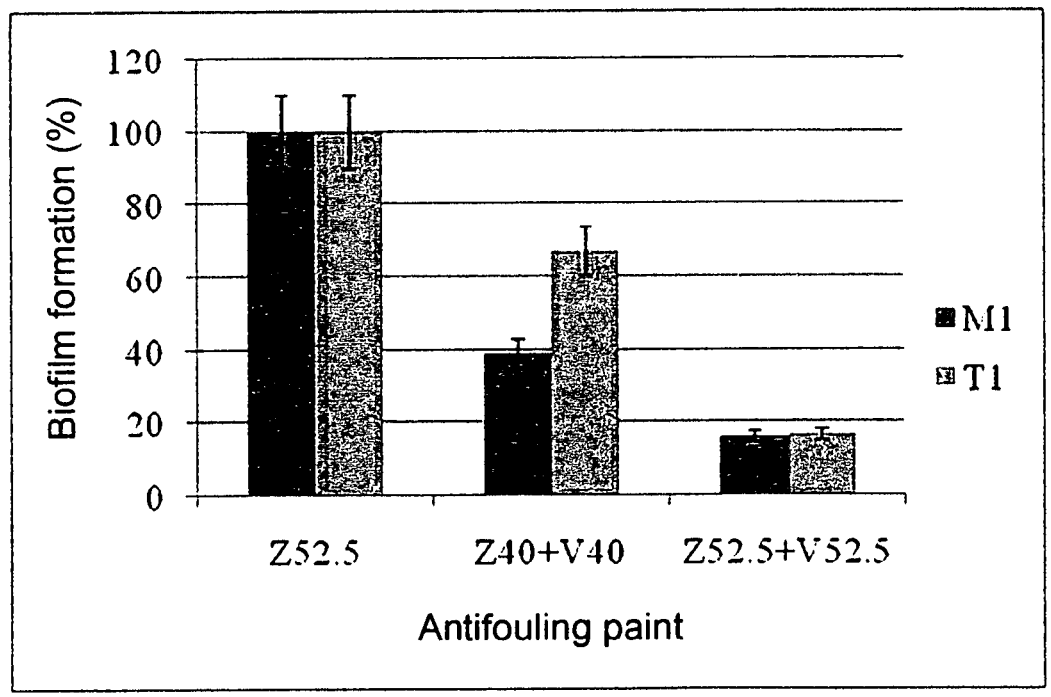
FIG. 13 shows a graph of biofilm formation (%) by sea bacteria M1 and T1 on surfaces treated with paints containing zinc pyrithione (Z52.5), 40 g zinc pyrithione and 40 g vanillin, and 52.5 g zinc pyrithione and 52.5 g vanillin.

The enhancement of the anti-fouling activity of the paint by vanillin is detectable with both of the microbial populations tested (M1 and T1), even reducing the concentration of zinc pyrithione from 52.5 to 40 g per kg of paint (FIG. 13). In this figure, the bio-film formation is expressed as a percentage of the amount of bio-film detected on the surface treated with the paint containing zinc pyrithione (100%). A reduced formation of bio-film (lower percentages) is indicative of a greater effectiveness of the paint.

The invention claimed is:

1. An anti-fouling paint comprising:
   an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
   a resin in an amount ranging between 5-40 wt %, and
   at least one conventional biocide selected from the group consisting of zinc pyrithione, copper pyrithione, zinc ethylene bis dithiocarbamate, tolylfluanide, dichlofluanide, 4,5-dichloro-2-N-octyl-4-isothiazoline-3-one, N'-tert-butyl-N-cyclopropyl-6-(methylthio)-1,3,5-triazine-2,4-diamine, and any combination thereof.

2. The antifouling paint according to claim 1, comprising at least one further component selected from the group consisting of solvents, pigments, filling charges and any combination thereof.

3. The anti-fouling paint according to claim 1, wherein the paint is an anti-fouling paint for boats.

4. The antifouling paint according to claim 1, wherein the anti-microbial-adhesion agent comprises a compound selected from the group consisting of vanillin, 4-hydroxybenzaldehyde, 3,4-dihydroxybenzaldehyde, 2,5-dimethoxybenzaldehyde, 3,4-dimethoxybenzaldehyde, and any combination thereof.

5. An anti-fouling paint comprising:
   an ecologically compatible anti-microbial-adhesion agent in an amount of between 3% and 30% wt %, the ecologically anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof, in combination with a resin in an amount ranging between 5-40 wt %.

6. The antifouling paint according to claim 5, wherein the anti-microbial-adhesion agent comprises a compound selected from the group consisting of vanillin, 4-hydroxybenzaldehyde, 3,4-dihydroxybenzaldehyde, 2,5-dimethoxybenzaldehyde, 3,4-dimethoxybenzaldehyde, and any combination thereof.

7. The antifouling paint according to claim 5, comprising at least one further component selected from the group consisting of solvents, pigments, filling charges and any combination thereof.

8. The anti-fouling paint according to claim 5, wherein the paint is an anti-fouling paint for boats.

9. An anti-fouling paint comprising:
   an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
   a resin in an amount ranging between 5-40 wt %,
   at least one further component selected from the group consisting of solvents, pigments, filling charges and any combination thereof, and
   between 10 and 45 wt % of a solvent.

10. An anti-fouling paint comprising:
    an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
    a resin in an amount ranging between 5-40 wt %,
    at least one further component selected from the group consisting of solvents, pigments, filling charges and any combination thereof, and
    between 10 and 30 wt % of a pigment.

11. An anti-fouling paint comprising:
    an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
    a resin in an amount ranging between 5-40 wt %,
    at least one further component selected from the group consisting of solvents, pigments, filling charges and any combination thereof, and
    between 3 and 30 wt % of filling charges.

12. A method of manufacturing an antifouling paint, the method comprising
    mixing an anti-microbial-adhesion agent in an amount between 3 and 30 wt %, the anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof, with a resin in an amount ranging between 5-40 wt % and with at least a further component selected from the group consisting of conventional biocides, solvents, pigments, filling charges, and any combination thereof.

13. The method according to claim 12, wherein the antifouling paint is for boats.

14. A method of painting a boat, the method comprising applying to the boat an anti-fouling paint, wherein the anti-fouling paint is for boats and comprises:
    an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof, and
    a resin in an amount ranging between 5-40 wt %.

15. A method of painting a boat, the method comprising applying to the boat, an anti-fouling paint, the anti-fouling paint comprising:
    an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
    a resin in an amount ranging between 5-40 wt %, and
    at least one conventional biocide selected from the group consisting of zinc pyrithione, copper pyrithione, zinc ethylene bis dithiocarbamate, tolylfluanide, dichlofluanide, 4,5-dichloro-2-N-octyl-4-isothiazoline-3-one, N'-tert-butyl-N-cycloprop-6-(methylthio)-1,3,5-triazine-2,4-diamine, and any combination thereof.

16. An anti-fouling paint comprising:
an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
filling charges in an amount ranging between 3 and 30 wt %, and
at least one conventional biocide selected from the group consisting of zinc pyrithione, copper pyrithione, zinc ethylene bis dithiocarbamate, tolylfluanide, dichlofluanide, 4,5-dichloro-2-N-octyl-4-isothiazoline-3-one, N'-tert-butyl-N-cyclopropy-6-(methylthio)-1,3,5-triazine-2,4-diamine, and any combination thereof.

17. An anti-fouling paint comprising:
an ecologically compatible anti-microbial-adhesion agent comprising a compound selected from the group consisting of vanillin and benzaldehyde substituted with one or two substituents selected from the group consisting of —OH (hydroxy) and —OCH$_3$ (methoxy), and any combination thereof,
filling charges in an amount ranging between 3 and 30 wt %,
at least one further component selected from the group consisting of solvents, pigments, resins and any combination thereof, and
a resin in an amount ranging between 5-40 wt %.

* * * * *